United States Patent
Moser et al.

[15] 3,686,429
[45] Aug. 22, 1972

[54] INTERACTION SYMBOL RECORDER FOR USE IN EVALUATING A DIALOGUE

[72] Inventors: Gene W. Moser, 9230 Perry Highway, Pittsburgh, Pa. 15237; Robert A. Cox, 6641 Wilkins Ave.; James E. Teza, 5889 Aylesboro Ave., both of Pittsburgh, Pa. 15217

[22] Filed: Jan. 28, 1969

[21] Appl. No.: 794,685

[52] U.S. Cl. .................................. 178/2 R, 35/22 R
[51] Int. Cl. ............................................... G09b 7/00
[58] Field of Search ..178/2, 4.1; 340/171; 179/2 DP; 35/22 R, 5, 6, 8; 235/145; 234/123

[56] References Cited

UNITED STATES PATENTS

| | | | |
|---|---|---|---|
| 3,508,002 | 4/1970 | Hauer | 179/2 DP |
| 3,453,379 | 7/1969 | Holmes, Jr. | 178/4.1 |
| 3,388,375 | 6/1968 | Sloughter | 179/2 DP X |
| 3,359,369 | 12/1967 | Iorio et al. | 179/2 DP |
| 2,932,816 | 4/1960 | Stiefel et al. | 235/145 X |
| 3,244,369 | 4/1966 | Nassimbene | 235/145 |
| 3,381,276 | 4/1968 | James | 340/172.5 |
| 3,394,368 | 7/1968 | Carr et al. | 235/145 X |
| 2,609,618 | 9/1952 | Chapple | 35/22 R |

Primary Examiner—Kathleen H. Claffy
Assistant Examiner—Thomas W. Brown
Attorney—T. H. Murray

[57] ABSTRACT

Disclosed is apparatus for use in evaluating dialogues in a teacher-pupil or panel-class situation. An observer-operated keyboard activates different ones of various parallel-connected tank circuits of an oscillator means, to generate signals of different frequency, dependent upon the keys depressed. The frequency signals are recorded, as on magnetic tape. The output portion of apparatus comprises an analyzer composed of a plurality of filters tuned to individual ones of the different frequencies recorded, along with appropriate display or print-out equipment.

5 Claims, 3 Drawing Figures

INVENTORS
GENE W. MOSER
ROBERT A. COX &
JAMES E. TEZA

ATTORNEY

INTERACTION SYMBOL RECORDER FOR USE IN EVALUATING A DIALOGUE

BACKGROUND OF THE INVENTION

1. Field of the Invention

This invention relates to apparatus for generating, storing, and displaying signals, and in particular, to apparatus useful in the evaluation of dialogues in situations such as teacher-pupil or panel-class.

2. Description of the Prior Art

It is known that an evaluation of the quality of teaching being done in a class-room-like situation can be obtained by putting a trained observer into the classroom, either merely for the purpose of making observations or for the purpose of correcting mistakes made by the teacher. A drawback of this method is that it is relatively expensive, requiring the full-time attention of a trained observer. Moreover, the evaluation obtained is almost entirely subjective; there is little reproducibility in such evaluations, so that they are of relatively little value for furthering the science of education.

It is known, moreover, to provide classrooms with listening devices, so that a person positioned at a central station may tune in upon a given one of a plurality of classrooms in which instruction is being given. Although this permits the time of the observer to be used greatly more efficiently, it is objectionable on a number of grounds as a tool for promoting the science of education. The data that it affords are relatively "unconcentrated." This method serves as a check against off-subject teacher monologues, but it is not adapted to provide the data for establishing the quality of the dialogue developed between the teacher and the class during the presentation of the subject. Moreover, the teaching process is not limited to verbalizations that can be picked up by a microphone and tape recorder. Demonstrations and non-verbal expressions of assent or disapproval should be taken into account.

For the advancement of the science of education, there have been recent developments in education research in accordance with which there have been developed some sets of symbols that represent various kinds of verbal or non-verbal behavior. For example, there are the systems of Flanders (Flanders, Ned A., Teacher Influence, Pupil Attitudes, and Achievement, O.E. 25040, U.S. Office of Education, 1965), and of Parakh (Parakh, Jal S., A Study of Teacher-Pupil Interaction in High School Biology Classes, Cornell University, Ithaca, N.Y., Doctoral Dissertation, 1965). These symbol-systems permit a trained observer to make shorthand-like notes of events occurring within an observed period of time (see the description given herein below in the description of the preferred embodiments for a specific example of the kinds of events recorded). Evaluation of the quality of classroom dialogue by means of such systems of symbols has, of course, been practiced, but this also has disadvantages. Proper observation requires the full attention of the observer, and this tends to interfere with having the observer make proper observation of the passage of time, such as the marking-off of the observed events into 5-minute time intervals. It is also greatly to be desired, but not to be obtained with a pencil-and-pad techniques hitherto used, that the labor of the observer in recording his observations be minimized, so that more attention can be devoted to the course of events in the classroom. It has also been true that the labor of evaluating the pad-and-pencil notes taken by the observer has been so great as to make analysis by manual compilation and tabulation unworkable except with sets of data so limited as to be of little value. The alternative, namely, to translate the observations into punched tape or cards, for evaluation by computer, necessarily involves the dangers of introducing error in that step, as well as the labor of developing satisfactory programs for the computer to which the cards or tape is fed. Moreover, the computer means is not, in general, provided with display apparatus that will yield the data desired in an understandable and useful form, without the development of unwanted or extraneous displays.

SUMMARY OF THE INVENTION

The invention comprises apparatus for use in evaluating dialogues, in a classroom situation or elsewhere. It contains a keyboard means operated by an observer and containing a plurality of keys coded with the symbols to be used. Connected therewith are means for generating signals that correspond to the key or keys depressed. Preferably, the signal-generating means is of the kind that generates a frequency signal, such as by connecting to a main oscillator means a tank circuit having the proper electrical characteristics. To the extent necessary or desired, it will be possible, with the use of electrical circuits or means that are known to those skilled in the art, to have one frequency represent the substantially simultaneous activation of one, two or three keys of the keyboard, as by the use of AND gates. The apparatus of the invention further comprises recorder means, such as a magnetic tape recorder of the kind in which tape is caused to pass a recorder head. The output portion of the apparatus of the invention necessarily comprises a detector means for receiving signals from the recording medium, and decoding means associated with the detector means. In many cases, the decoding means is advantageously made of a plurality of passive filter elements, each having electrical characteristics such as to pass only a selected one or certain selected ones of the frequency signals detected by the detector means. The apparatus of the invention also comprises final-stage output means, which may take different forms, depending upon requirements. Although useful results may be obtained when the final-stage output means comprises tape-punch means and a computer-operated electrical typewriter, in a preferred form of the invention, the final-stage output means comprises an array of odometers or other suitable counters, each arranged to operate in response to signals passed by one of said passive filter elements. Preferably, there are also provided a plurality of suitable view plates that can, as herein shown, be used sequentially or individually to identify the pertinent ones of values shown on the odometers or counters. With the apparatus of the invention, dialogue evaluations can be more quickly, easily, conveniently, and errorlessly made, even with the use of observers of less than full professional status.

BRIEF DESCRIPTION OF THE DRAWINGS

A complete understanding of the invention may be had from the foregoing and following description thereof, taken together with the appended drawings, in which.

DESCRIPTION OF THE PREFERRED EMBODIMENTS

Figure 1:
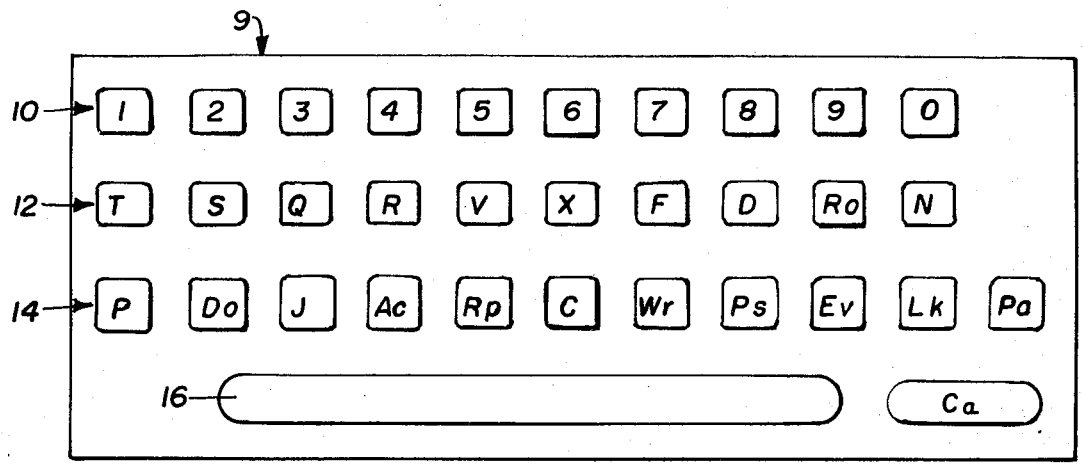
FIG. 1 is a representation of a keyboard of an observer-operated machine comprising a portion of the apparatus of the present invention.

Referring now to the drawings, and in particular FIG. 1, there is shown a keyboard 9, comprising 32 keys, which are arranged in rows 10 and 12 of ten keys each, a row 14 of eleven keys and a bottom row comprising a space bar 16.

The meanings of the various symbols on the keys of keyboard 9 are indicated in the table below.

TABLE

| | |
|---|---|
| T = teacher | N = nature of subject |
| P = pupil | Ps= problem-solving |
| S = self-initiated statement | Ev= evaluation |
| Q = question | Lk= lack of knowledge |
| R = directed response | Do= demonstration |
| V = volunteer information | J = joke |
| X = explanation | Ac= acceptance of response |
| F = fact | Rp= qualification or correction |
| D = definition | C = chastisement |
| Ro= routine | Wr= writing |
| Ca= cancel | Pa= pause |

The numerals on the keyboard 9 are used to identify individual ones of the pupils, as will be understood from the following Example, which demonstrates the manner of using the keyboard 9 to record 30 events taking place in discourse between a teacher and a class of 32 pupils in a time of about 5 minutes.

EXAMPLE

| Event | Symbol Set | Explanation |
|---|---|---|
| 1 | TSRo: | T states routine |
| 2 | TSRo: | T states routine |
| 3 | TSF: | T states fact |
| 4 | TSF: | T states fact |
| 5 | TSF: | T states fact |
| 6 | TQF: | T questions fact |
| 7 | PRX 09: | P No. 9 responds explanation |
| 8 | PRX 09: | P No. 9 responds explanation |
| 9 | TQX: | T questions explanation |
| 10 | PVX 05: | P No. 5 volunteers explanation |
| 11 | TQX: | T questions explanation |
| 12 | TSX: | T states explanation |
| 13 | TSX: | T states explanation |
| 14 | TDo: | T demonstrates |
| 15 | TDo: | T demonstrates |
| 16 | TDo: | T demonstrates |
| 17 | PQRo 03: | P No. 3 questions routine |
| 18 | PSF 03: | P No. 3 states fact (self-initiated) |
| 19 | PSF 03: | P No. 3 states fact (self-initiated) |
| 20 | TQF: | T questions fact |
| 21 | PSX 03: | P No. 3 states explanation (self-initiated) |
| 22 | PSX 03: | P No. 3 states explanation (self-initiated) |
| 23 | TQD: | T questions definition |
| 24 | PVF 27: | P volunteers fact |
| 25 | PVF 27: | P volunteers fact |
| 26 | PVF 27: | P volunteers fact |
| 27 | TSLk: | T states lack of knowledge |
| 28 | PRX 27: | P No. 27 responds explanation |
| 29 | PRX 27: | P No. 27 responds explanation |
| 30 | TAC: | T accepts |

It will be understood that after each of these events has taken place, the observer presses the appropriate ones of the keys of the keyboard 9, ending with the space bar 16 to indicate the completion of that particular set of symbols. It is also to be observed that, in the case of the pupils, it is necessary to use the appropriate keys from the row 10 to indicate which pupil took the action involved. It will be understood that a similar kind of coding can be used if, in place of a single teacher, there is, for example, a panel composed of 2 to 32 persons; the same symbols would be used, except that person-coding would be required for both of the groups taking part in the dialogue.

Figure 2:
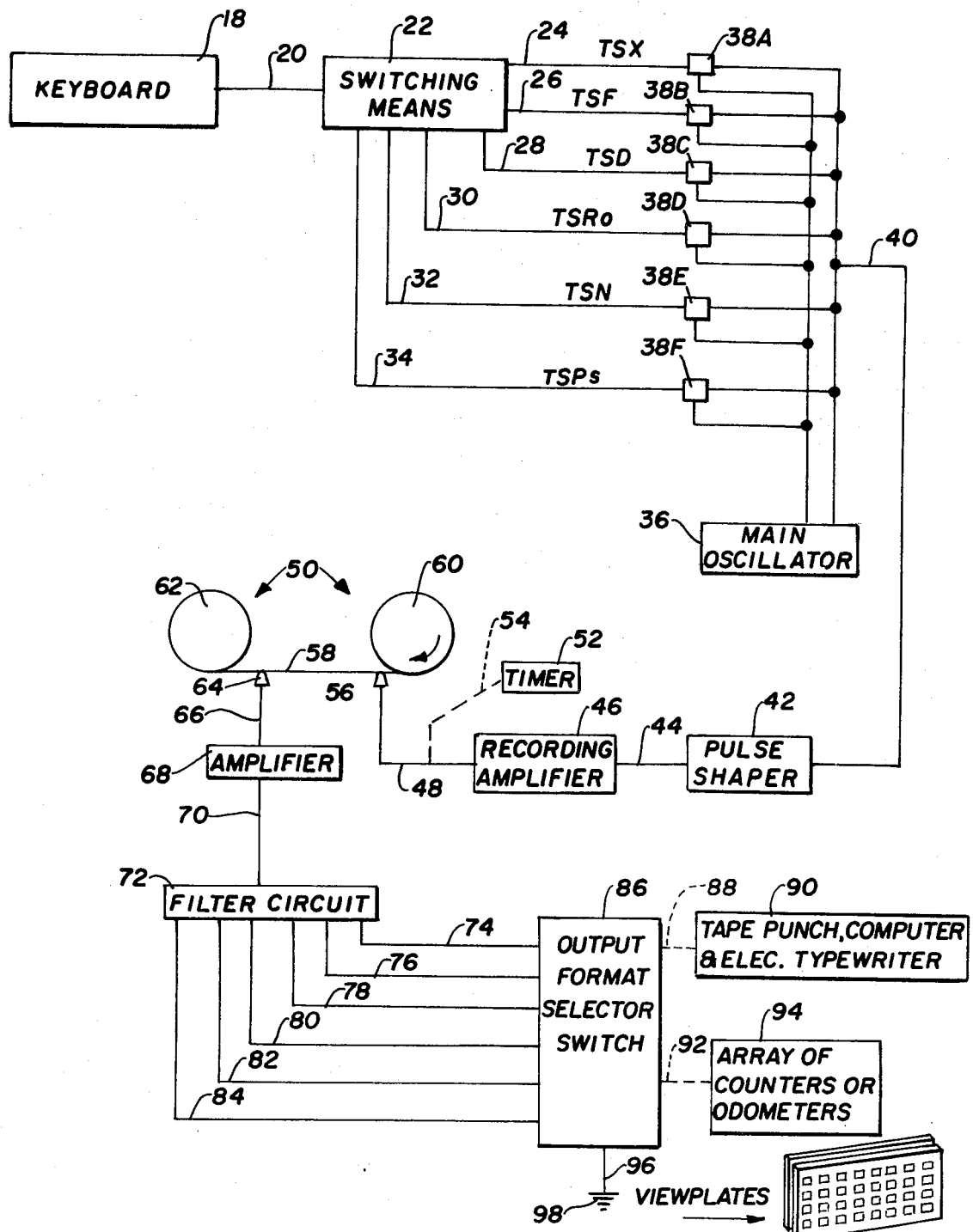
FIG. 2 is a schematic overall view of the apparatus of the present invention.

Referring now to FIG. 2, this depicts in schematic form the entire apparatus of the present invention. This comprises a keyboard means 18, such as the keyboard 9 described above, which communicates, through a line 20 to a switching means 22 the various combinations of signals of the kind indicated above. It is to be understood that the switching means 22 is made up of a plurality of AND gates or the like, such that, for example, on the line 24, there exists a signal if the teacher states an explanation; on the line 26, if the teacher states a fact; on the line 28, if the teacher states a definition; on the line 30, if the teacher states a routine; on the line 32, if the teacher states something concerning the nature of the subject or a subject; and on the line 34, if the teacher states something concerning problem solving. It is to be understood that the switching means 22 is sufficiently extensive to take into account all the various possible permutations and combinations of the depression of keys of the keyboard 9 between one depression of the space bar 16 and the next, with it being intended that each of the various possible combinations shall be indicated by a particular frequency to be generated by means of the main oscillator 36. To that end, there are connected in parallel with the main oscillator 36 a plurality of tank circuits 38a–38f, each of which contains an appropriate combination of resistance with capacitance or inductance such that there will be produced, on the line 40, an individual frequency corresponding appropriately to the combination of keys depressed on the keyboard 9 in recording the event involved. In this manner, there are produced on the line 40 a series of frequency signals that correspond to the various observed events in the dialogue that is being recorded, and these frequency signals are shaped by the pulse shaper 42 and conveyed by the line 44 to the recording amplifier 46, from which they are conveyed by the line 48 to the recording means 50. As indicated in the schematic diagram in FIG. 2, the apparatus preferably further includes a timer 52 that is operatively connected, as indicated at 54, with the line 48, or another appropriate part of the system. As one example, the timer 52 may emit a blip of appropriate frequency at appropriate intervals, for example, every five minutes, and this may be conveyed by the line 48 to the recorder head 56 that is associated with the magnetic tape 58 as it passes from the one spool 60 to the other spool 62 of the magnetic-tape recording means 50.

Also associated with the magnetic tape 58, there is a detector head 64 that communicates by a line 66 with an amplifier 68 and then through line 70 with a filter circuit 72. It is to be understood that in most instances the tape 58 will be rewound from the spool 62 onto the spool 60 before it is again run through the recording apparatus 50 to be picked up by the detection head 64. Moreover, the filter circuit 72 comprises a plurality of elements, each arranged in parallel, that contain an appropriate combination of resistance with capacitance or inductance that is such as to pass, on the output lines 74—84, appropriate signals whenever particular corresponding ones of the combinations corresponding to the existence of signals on the lines 24—34 are detected by the head 54. It will be understood that the filter circuit 72 is quite extensive, possibly having the ability to detect many or several dozen different individual frequencies, producing on an output line corresponding to one of the lines 74—84, appropriate signals.

The signals on the lines 74—84, as well as such other signals as may be produced upon additional corresponding lines, depending upon the number of symbols and combination of symbols to be dealt with, pass then to the output format selector switch 86, which is of such nature that it may be used either to connect the output signals, as indicated by the line 88, to the appropriate display means 90, comprising a tape punch, computer, and electrically operated typewriter, or in the alternative, as indicated by the line 92, to an array of counters or odometers 94. It will readily be seen, moreover, that in the event that the latter mode of operation of the output format selector switch 86 is selected, and considering that the array of counters or odometers may be, for example, of such dimensions as four units by eight units, that it may be necessary for the output format selector switch to be movable to any of six or eight or 12 positions, so that appropriate ones of the outputs contained on the lines 74—84 will be conveyed appropriately to the array 94. Signals rejected by the switch 86 may be conveyed by the line 96 to ground 98. Moreover, it will in many instances be desirable to provide a plurality of view plates 100 that may be fitted over the array 94, so as to identify for research purposes the various values there depicted.

Figure 3:
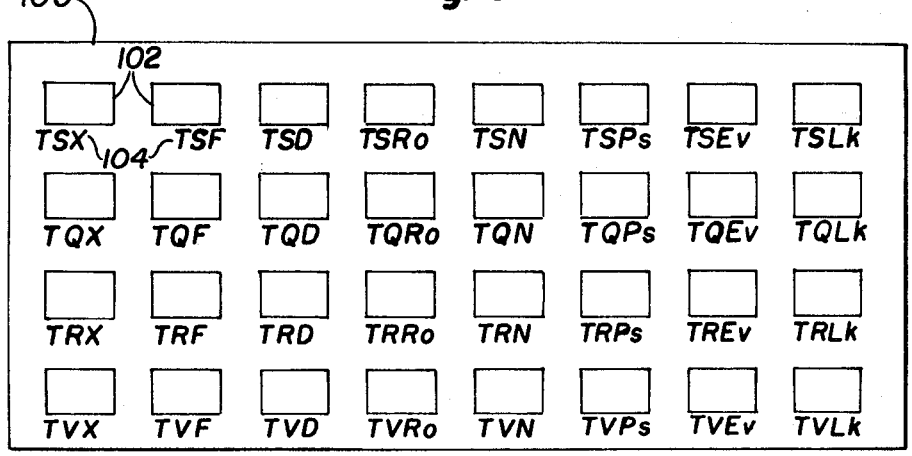
FIG. 3 is a detailed view, showing one of a number of view plates that, in accordance with one aspect of the invention, are used in conjunction with a portion of the apparatus disclosed in FIG. 2.

Referring now to FIG. 3, there is shown one of a plurality of possible view plates 100. As view plate 100 will contain a number of openings 102 corresponding to the number of places in the array 94 of counters or odometers, and in an appropriate place adjacent to each of the openings 102, a legend 104, such as "TSX" or "TSF", indicating the nature of the event counted and tabulated in the array 94. In most instances, a view plate 100 may be made of clear, translucent, or opaque plastic, so long as it contains appropriate openings 102 through which the entries in the array 94 may be seen and contains also appropriate legends 104 indicating, for one or another of the various positions of the switch 86, the readings that may be obtained upon the array 94.

It will be seen from the foregoing that it may be necessary, in certain circumstances, several times to rewind from one of the spools 62 onto the other spool 60 the tape 58 contained in the recording means 50, with the output switch 86 being set to a different position for the next passage of the tape 58 past the detector head 64, so that the array 94 of counters or odometers may, as desired, display different desired and appropriate values, identifiable by an appropriate one of the various view plates 100. Those skilled in the art will appreciate that, even if such rewinding is required, the labor involved in obtaining a complete recording and evaluation of a particular dialogue is very greatly lessened from that which is required if the symbols corresponding to the various events taking place in the dialogue are recorded only using a pad and pencil, so that thereafter a complete manual evaluation of the various sets of symbols therein contained may be had. An improvement in efficiency is obtained such that, for example, the time for a complete evaluation is shortened from 3 hours to 15 minutes.

From the foregoing, it will be appreciated that by a consideration of the number of times that each event occurs in a dialogue, that dialogue may be analyzed. For example, a dialogue between a teacher and a pupil may show the following tabulated results of the number of times that each event in a dialogue between the teacher and pupil occurs:

| Party T | | Party P | |
|---|---|---|---|
| Event | Frequency | Event | Frequency |
| $TSR_o$ | 3 | $PQR_o$ | 8 |
| TSF | 185 | PSF | 3 |
| TQF | 2 | PQF | 10 |
| $TP_o$ | 90 | PAC | 30 |
| TSLk | 1 | TSLk | 0 |
| TAC | 3 | TAC | 0 |

From the table, it can be seen that there are three $TSR_o$ events, indicating that the teacher is stating a routine and that there are eight $PQR_o$ events, meaning that the pupil is questioning the routine. This might indicate, for example, that the teacher's routine statement was faulty or that the pupil simply did not understand. Furthermore, a high number (185) of TSF's indicates that the teacher is primarily lecturing. Note that there are only three PSF's, indicating that the pupil is stating very few facts. Furthermore, with only ten PQF's, the pupil is questioning very few facts and is primarily accepting all of the statements of the teacher as indicated by 30 PAC's.

All of the various events occurring during a dialogue will, of course, be recorded on the tape 58. It is, however, possible to feed only selected ones of these events to the odometers or the tape-punch computer 90 by closing selected ones of the switches in the switching circuitry 86. Thereafter, the tape may again be scanned and other events selectively analyzed.

While we have shown and described herein a certain embodiment of our invention, we intend to cover as well any change or modification therein which may be had without departing from its spirit or scope.

We claim as our invention:

1. Apparatus for use in evaluating a dialogue comprising, in combination:
   keyboard means comprising a plurality of individual keys each bearing indicia,
   said keys being actuable to produce discrete electrical pulse signals each of which is indicative of an event occurring in a dialogue and the person engaged in the dialogue to which the event is ascribable, at least some of said signals identifying the nature of spoken words by persons engaged in the dialogue, means for storing said electrical signals in the sequence in which they occur, means for counting the number of times that said discrete electrical pulse signals occur during a dialogue and hence the number of times that the events corresponding to those signals occur during the dialogue, and means coupled to said counting means for displaying the number of times that selected ones of said stored signals representing events have occurred during a dialogue and the persons to which such events are ascribable to enable a determination of the characteristics of said dialogue.

2. Apparatus as defined in claim 1, characterized in that said display means includes a tape-punch means and a computer-controlled electric typewriter.

3. Apparatus as defined in claim 1, characterized in that said display means includes an array of counters each of which is responsive to a selected one of said discrete electrical signals for indicating the number of times that said discrete electrical signal occurs.

4. Apparatus as defined in claim 3, characterized in that said array of counters comprises a plurality of odometers arranged on a panel, and including a plurality of view plates each of which is adapted to be placed over said panel and is provided with selected cut-out portions which expose only selected ones of said odometers whereby the number of times that only selected ones of said electrical signals occur will be viewed through said view plate.

5. Apparatus as defined in claim 1 including means coupled to said keys for producing discrete pulsed signals each having a frequency identifying an event in a dialogue, filter means for thereafter separating said discrete signals, and means connecting said filter means to said counting means.

* * * * *